(12) United States Patent
Kuhlmann et al.

(10) Patent No.: US 10,254,154 B2
(45) Date of Patent: Apr. 9, 2019

(54) PIVOTABLE COVER WITH RELEASABLE HOLDING ELEMENTS OF A DRAFT SHIELD OF A PRECISION BALANCE, AND ASSOCIATED DRAFT SHIELD

(71) Applicant: Sartorius Lab Instruments GmbH & Co. KG, Goettingen (DE)

(72) Inventors: Otto Kuhlmann, Goettingen (DE); Michael Laubstein, Goettingen (DE); Jan Von Steuben, Goettingen (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 177 days.

(21) Appl. No.: 15/164,221

(22) Filed: May 25, 2016

(65) Prior Publication Data

US 2016/0265962 A1    Sep. 15, 2016

Related U.S. Application Data

(63) Continuation of application No. PCT/EP2014/002813, filed on Oct. 18, 2014.

(30) Foreign Application Priority Data

Nov. 25, 2013    (DE) .................. 10 2013 112 998

(51) Int. Cl.
*G01G 21/28*    (2006.01)
*E05C 19/02*    (2006.01)

(52) U.S. Cl.
CPC ......... *G01G 21/286* (2013.01); *E05C 19/022* (2013.01); *E05Y 2900/204* (2013.01)

(58) Field of Classification Search
CPC ............... G01G 21/286; E05C 19/022; E05Y 2900/204
See application file for complete search history.

(56) References Cited

U.S. PATENT DOCUMENTS 3,862,773 A  *  1/1975  Bisbing ................. E05C 19/022
                                                        292/70
4,063,330 A  *  12/1977  Triplette ............. E05D 11/1014
                                                        16/321
(Continued)

FOREIGN PATENT DOCUMENTS

DE      102008008486 A1    8/2009
EP        0574668 A1      12/1993
(Continued)

OTHER PUBLICATIONS

"Carbon Brushes" wepage from Helwig Carbon Products, Inc. webpage (http://www.helwigcarbon.com/products/carbon-brushes/) downloaded Feb. 9, 2018.*

(Continued)

*Primary Examiner* — Randy W Gibson
(74) *Attorney, Agent, or Firm* — Edell, Shapiro & Finnan, LLC (57) ABSTRACT

A cover (24) of a draft shield (12) of a precision balance (10), has a support frame (36) on which holding elements (40) and/or guide rails (38) are provided for a front panel (18) and/or at least one side panel (26), and a cover element (54) which is pivotable, about a bearing (60) provided at one edge, between a holding position and a releasing position. At the edge positioned opposite the bearing are holding elements (72, 74) which fix the cover element at the opposite edge of the support frame, wherein the holding elements can be released by displacing at least one portion of the cover element in the direction toward the bearing.

17 Claims, 11 Drawing Sheets

(56) References Cited

U.S. PATENT DOCUMENTS

| | | | | |
|---|---|---|---|---|
| 4,167,298 A * | 9/1979 | Plattner | E05F 1/1075 | 217/60 R |
| 4,821,821 A * | 4/1989 | Kelley | G01G 21/286 | 177/181 |
| 5,067,625 A * | 11/1991 | Numata | A45C 11/24 | 220/230 |
| 5,292,158 A * | 3/1994 | Kurosaki | E05C 19/022 | 292/19 |
| 5,345,043 A | 9/1994 | Luechinger et al. | | |
| 5,520,313 A * | 5/1996 | Toshihide | B60N 2/4686 | 220/815 |
| 5,583,322 A * | 12/1996 | Leisinger | G01G 21/286 | 16/342 |
| 5,603,540 A * | 2/1997 | Shibao | E05B 77/06 | 292/128 |
| 6,056,333 A * | 5/2000 | Wach | E05C 19/022 | 292/137 |
| 6,679,572 B2 * | 1/2004 | Sears | D06F 39/14 | 312/319.2 |
| 6,686,545 B2 * | 2/2004 | Luchinger | G01G 21/286 | 177/126 |
| 7,165,790 B2 * | 1/2007 | Bella | E05C 19/022 | 292/302 |
| 7,193,164 B2 * | 3/2007 | Olesen | G01G 21/286 | 177/180 |
| 7,531,759 B2 * | 5/2009 | Luchinger | G01G 21/286 | 177/180 |
| 7,732,720 B2 * | 6/2010 | Olesen | G01G 21/286 | 177/180 |
| 7,793,995 B2 * | 9/2010 | King | E05B 77/06 | 292/332 |
| 7,834,278 B1 * | 11/2010 | Zeiss | G01G 21/286 | 177/180 |
| 7,905,524 B2 * | 3/2011 | Migli | E05C 19/022 | 16/235 |
| 8,198,553 B2 | 6/2012 | Duerst et al. | | |
| 8,376,423 B2 * | 2/2013 | Lesjak | E05C 19/022 | 292/332 |
| 2003/0071047 A1 * | 4/2003 | Harada | E05D 3/18 | 220/835 |
| 2006/0185909 A1 | 8/2006 | Olesen et al. | | |
| 2014/0125071 A1 * | 5/2014 | McWilliams | E05B 17/183 | 292/336.3 |

FOREIGN PATENT DOCUMENTS

| | | |
|---|---|---|
| EP | 1195585 A1 | 4/2002 |
| EP | 2060885 A1 | 5/2009 |

OTHER PUBLICATIONS

International Search Report in counterpart International Application No. PCT/US2014/002813, dated Dec. 4, 2014, 4 pages; along with English Translation.

* cited by examiner

PIVOTABLE COVER WITH RELEASABLE HOLDING ELEMENTS OF A DRAFT SHIELD OF A PRECISION BALANCE, AND ASSOCIATED DRAFT SHIELD

CROSS REFERENCE TO RELATED APPLICATIONS

This is a Continuation of International Application PCT/EP2014/002813, which has an international filing date of Oct. 18, 2014, and the disclosure of which is incorporated in its entirety into the present Continuation by reference. The following disclosure is also based on and claims the benefit of and priority under 35 U.S.C. § 119(a) to German Patent Application No. DE 10 2013 112 998.6, filed Nov. 25, 2013, which is also incorporated in its entirety into the present Continuation by reference.

FIELD OF THE INVENTION

The invention relates to a cover of a draft shield of a precision balance, and a draft shield for a precision balance.

BACKGROUND

It is commonly known to mount a draft shield on a precision balance, said draft shield surrounding a weighing chamber above the weighing dish of the balance. This draft shield has the task of preventing the influencing of the weighing process by air movements, electrostatic attractive forces or thermal radiation. In order to be able to place an object to be weighed onto the weighing dish, parts of the draft shield, for example, a side panel or a cover, are displaceable so that the draft shield can be opened in order to place the object to be weighed.

The cover is often configured in multiple parts having a support frame and a cover element wherein, for example, guide rails are provided on the support frame. The side panels are displaceably mounted in the guide rails, for example, by guide elements. The cover element is held, for example, pivotably on the support frame and can cover the guide rails such that the guide elements cannot come out of the guide rails and are therefore securely held in the guide rails. The fixing in a holding position in which the guide rails are covered has conventionally been accomplished with separate catches which are held on the support frame and must be rotated or pivoted to release the cover element. However, the operation of these catches is often very complex.

From DE 10 2008 008 486 A1, a cover of a draft shield of a balance is known which, in its operating position, can be locked by a holding device. In order to release the cover, initially holding elements must be pivoted from a locking position into a releasing position in which the locking elements for the cover which are arranged behind the holding elements are accessible. Subsequently, these locking elements must be actuated in order to release the cover. Often, the locking elements must be actuated with a tool.

SUMMARY

It is an object of the invention to provide a cover for a draft shield of a precision balance which enables simple pivoting of the cover element between a holding position and a releasing position. It is a further object of the invention to provide a draft shield which has a cover with a cover element that is easy to open.

In order to achieve these objects, according to one formulation, the invention provides a cover of a draft shield of a precision balance, having a support frame on which holding elements and/or guide rails are provided for a front panel and/or at least one side panel, and having a cover element which is pivotable about a bearing provided at one edge, between a holding position and a releasing position, wherein holding elements are provided at a second edge positioned opposite the bearing, which fix the cover element at the second edge of the support frame. The holding elements can be released by displacement of at least one portion of the second edge of the cover element in the direction toward the bearing.

The fixing of the cover element in the holding position takes place according to this formulation of the invention by holding elements which can be released by displacement of the cover element in the direction toward the bearing. This enables simple releasing of the holding elements and movement of the cover element from the holding position into the release position. The second edge of the cover element, for example, the front edge, must only be pressed in the direction toward the bearing. Following releasing of the holding elements by this pressure, the actuating direction must be changed only slightly, for example, obliquely upwardly in order to pivot the cover element into the releasing position. The cover element can thus be unlocked and subsequently pivoted into the releasing position. Elaborate releasing of additional catches is not necessary.

The holding elements can be formed, for example, by locking elements and/or locking receptacles provided on the cover element and directed away from the bearing and by locking receptacles and/or locking elements provided on the frame and directed in the direction toward the bearing. These can be simply released by displacement of the cover element in the direction toward the first edge, that is, toward the bearing. In addition, rapid fixing of the cover element in the holding position is possible in that the cover element is pivoted into the holding position, by which the locking elements lock onto the locking receptacles. The locking elements can be, for example, hooks which have an undercut or a locking incline which, given an increased force which pushes the cover element from the holding position into the releasing position, can slide away from the locking receptacles.

In order to release the locking elements from the locking receptacles, it is sufficient if the second edge of the cover element or the region of the cover element on which the locking elements or the locking receptacles are provided is pushed in the direction of the bearing. Preferably, however, the whole cover element is displaceable in the direction toward the bearing in order to release the holding elements. The cover element can thus be made from one piece and have a very high intrinsic stability.

In order to enable displacement of the cover element in the direction toward the bearing, for example, the bearing can be configured resilient away from the second edge, wherein the bearing has, in particular, bearing elements which are displaceable to a limited extent. The cover element is preferably held on these bearing elements. The bearing elements can be held, for example, with springs on support frames, on the draft shield or the precision balance, so that the bearing elements can give way resiliently.

Preferably, the bearing elements are spring-loaded in the direction toward the holding elements, so that by the bearing elements, for example, the locking elements are pressed into the locking receptacles.

The bearing elements can each have a bearing pin about which the cover element is pivotable. A bearing hook which engages on this bearing pin can be provided on the cover element. The bearing hook can, for example, be configured open so that the cover element can be completely removed from the support frame after pivoting into the releasing position. For this purpose, the bearing hooks are preferably configured open facing away from the holding elements. Since the opening of the bearing hooks is directed away from the holding elements, the bearing hooks are pressed in the holding position by the bearing elements and the holding elements against the bearing pins, so that these cannot be released from one another. In particular, according to one embodiment, the bearing hooks are configured such that they can lock onto the bearing pins.

The cover element can be pivoted manually, for example, by a pressing force, from the holding position into the releasing position. However, it is also conceivable that between the frame and the cover element, at least one spring element is provided which presses the cover element into the releasing position. It is thus only necessary to displace the cover element or the second edge of the cover element in the direction toward the bearing in order to release the holding elements from one another. Following the releasing of the holding elements, the cover element is pressed by the spring element into the releasing position.

The cover can additionally comprise a cover panel which is displaceably mounted on the support frame, wherein in the holding position, the cover element holds the cover panel on the support frame and, in the releasing position, releases the cover panel. Independently thereof, the cover panel can be displaceably mounted in the support frame, so that the weighing chamber can be opened or closed by displacement of the cover panel. Removal of the cover panel, for example, for cleaning purposes, is only possible however if the cover element is in the releasing position. The cover panel is therefore fixed if the cover element is in the holding position.

In order to prevent the cover panel from becoming electrostatically charged, it preferably has an electrically conductive coating.

In order to prevent scratching or damage to the cover panel and/or the electrically conductive coating, slide rails are preferably provided for the cover panel on the support frame and are made, in particular, of plastics. In this embodiment, electric conductors, in particular, brushes, are additionally provided on the slide rails lying against the cover panel and connecting it electrically to the support frame, so that an electrostatic charge can be conducted away thereby.

In order to prevent an electrostatic charging of the cover or parts of the cover, the support frame, the cover panel and/or the cover element are configured or coated to be electrically conductive and are electrically conductively connected to one another.

According to a further formulation of the invention, a draft shield is provided for the precision balance, having a front panel, a rear wall, two mutually opposed side panels and a cover, wherein guide rails for the side panels and/or holding elements for the front panel are provided on the support frame. In this way, a simple construction of the draft shield is possible since no additional elements are necessary for fixing the front panel or for mounting the side panels.

The guide rails can have, for example, a U-shaped, upwardly open cross-section so that the side panels can simply be hung into the guide rails. In the holding position, the cover element preferably covers the guide rails, so that the side panels cannot be removed from the guide rails.

In order to prevent influencing of the measurement results by an electrostatic charging of the draft shield, the cover, the front panel and/or the side panels are configured or coated to be electrically conductive and are electrically conductively connected to one another, so that static charges can be conducted away.

The support frame is held, for example, on the rear wall.

BRIEF DESCRIPTION OF THE DRAWINGS

Further advantages and features are disclosed in the following description making reference to the accompanying drawings. In the drawings.

DETAILED DESCRIPTION

Figure 1:
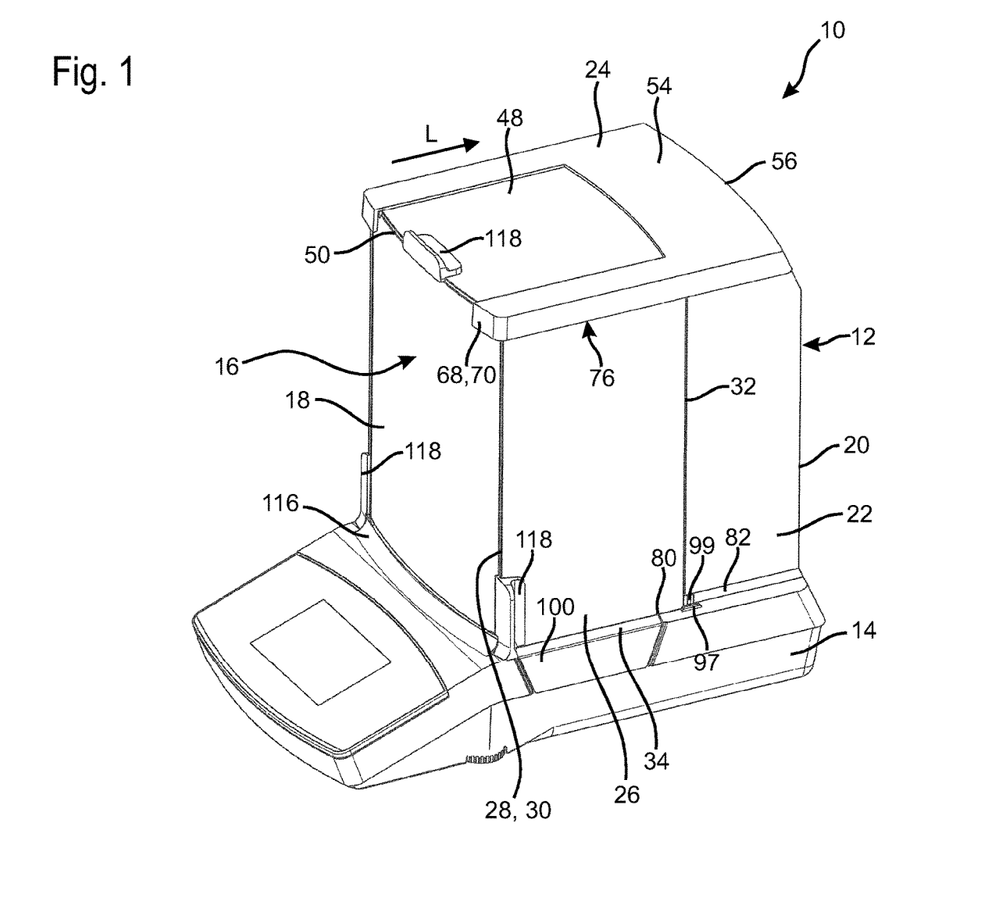
FIG. 1 is a perspective view of a balance with a draft shield according to the invention.

FIG. 1 shows a precision balance 10 with a weighing device 14 and a draft shield 12. The draft shield 12 serves to surround a weighing chamber 16 above the weighing device 14 and thus to protect the weighing dish of the weighing device 14 against external influences, for example, air movements, electrostatic attractive forces or thermal radiation and thereby to ensure an accurate measurement.

The draft shield 12 has a front panel 18, a rear panel 20 and two mutually opposed side panels 22. In addition, a cover 24 is provided which closes the draft shield 12 upwardly. The rear wall 20 is firmly connected to the weighing device 14 and forms a support for the cover 24.

Figure 2:
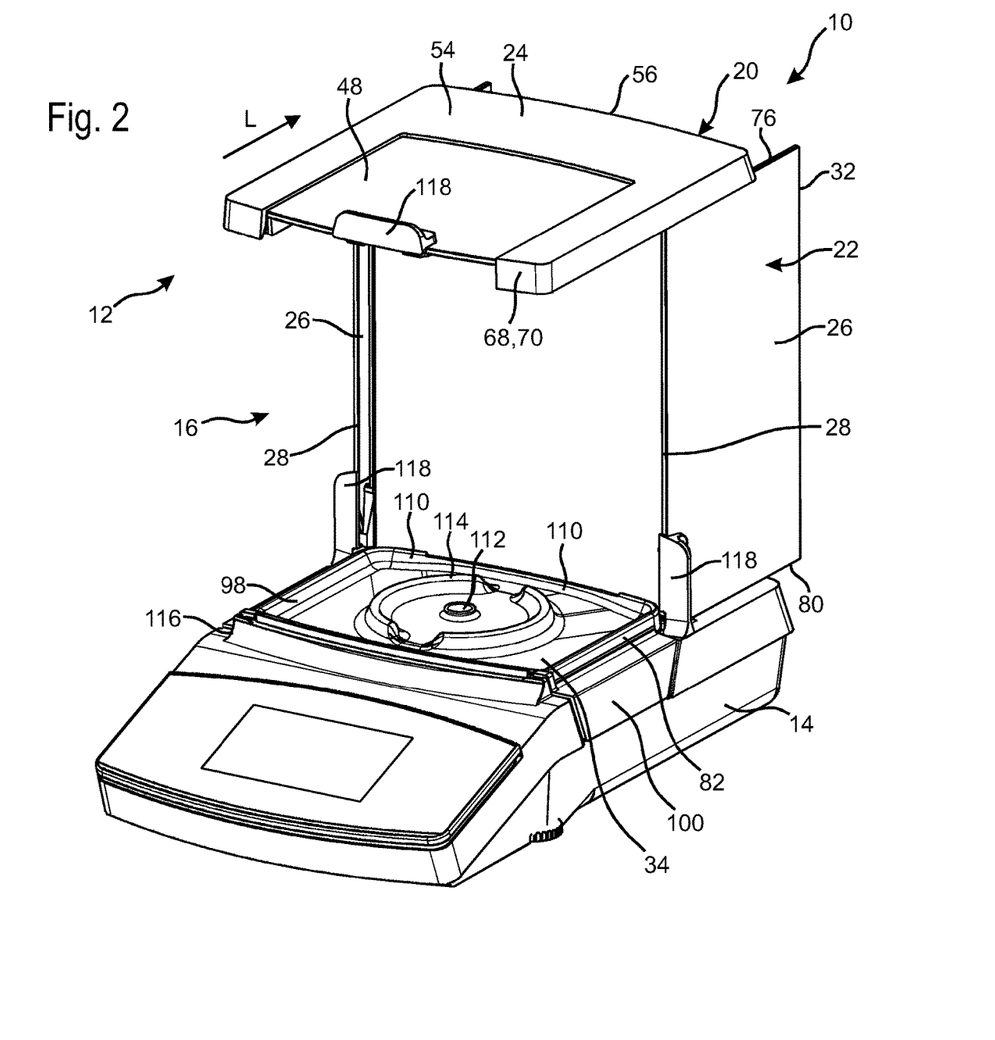
FIG. 2 is the balance of FIG. 1 with the side panels in the open position and the front panel removed.

The side walls 22 each have a side panel 26 which are respectively displaceable between a closed and an open position (FIG. 2). The side panels 26 and the front panel 18 extend from the cover 24 to the weighing device 14.

In the closed position shown in FIG. 1, the front edges 28 of the side panels 26 lie against the side edges 30 of the front panel 18. The rear edges 32 of the side panels 26 lie against the side walls 22. The side walls 22 are tightly connected to the rear wall 20. Since the side panels 26 and the front panel 18 are also closed off upwardly at the cover 24 and downwardly at the weighing device 14, the weighing chamber 16 is completely closed off in the closed position of the side panels 26.

In order to be able to clean the draft shield 12 and the precision balance 10 easily, the side panels 26, the front panel 18, parts of the cover 24 and the weighing chamber base 34 are configured demountable, as will now be described. In particular, all the parts can be disassembled without tools.

The demountable components of the draft shield 12 and the precision balance 10 will now be described.

Figure 3:
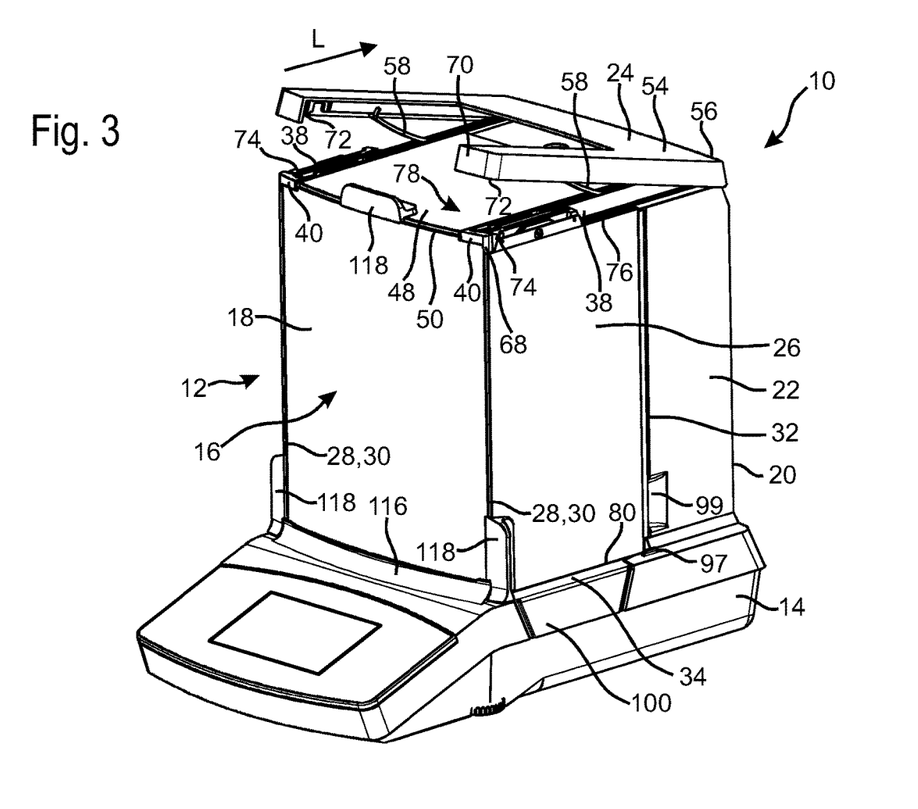
FIG. 3 is a perspective view of the balance of FIG. 1 with the cover partially open.
Figure 4:
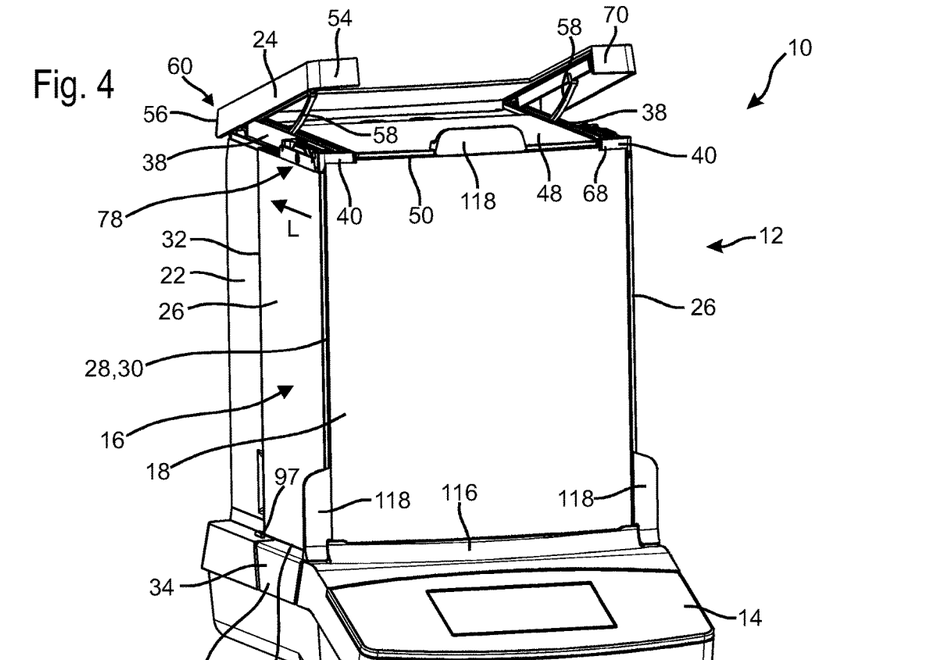
FIG. 4 is the draft shield of FIG. 3 from a second perspective.

As shown in FIGS. 3 and 4, the cover 24 of the draft shield 12 has a support frame 36 which is held at the rear wall 20. Guide rails 38 for the side panels 26 and holding elements 40 for the front panel 18 are provided on this support frame.

Figure 5:
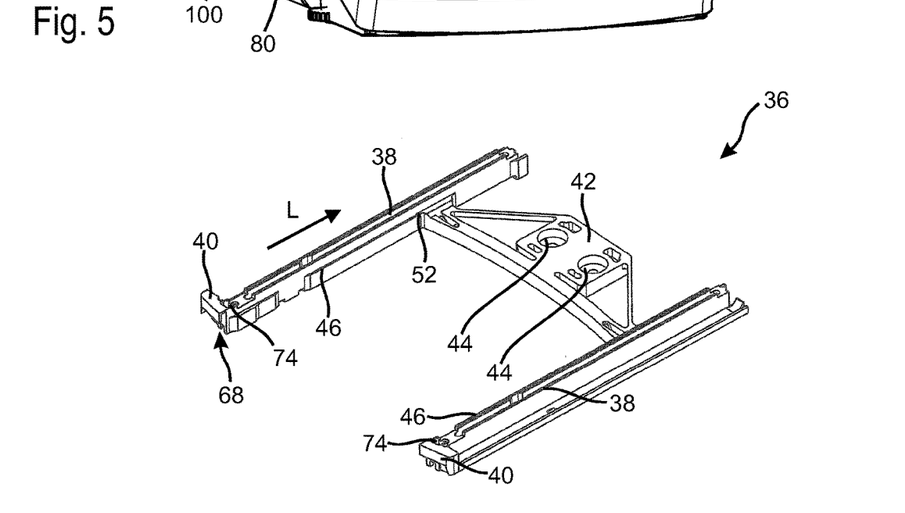
FIG. 5 is a perspective view of a support frame of a cover of the draft shield of FIG. 1 with guide rails of a suspension guide according to the invention.

As shown particularly in FIG. 5, the holding elements 40 are provided on a front end of the guide rails 38. The two guide rails 38 are connected to one another with a holding geometry 42. Provided on this holding geometry 42 are fastening apertures 44 for mounting the support frame 36 on the rear wall 20.

Additionally, provided on the surfaces of the guide rails 38 facing one another are slide rails 46 extending in the longitudinal direction L of the guide rails 38. A cover panel 48 (see FIGS. 3 and 4) is mounted on these slide rails 46 and lies, in a closed position, against the upper edge 50 of the front panel 18. In order to provide access to the weighing chamber 16, the cover panel 48 can be displaced in the longitudinal direction L on the slide rails 46.

The slide rails 46 are made preferably of plastics. The remainder of the support frame 36 can be made of metal, for example, aluminum, or also plastics. The cover panel 48 is made, for example, of glass and preferably has an electrically conductive coating. The fact that the slide rails 46 are made of plastics reliably prevents scratching of the cover panel 48. In order to prevent electrostatic charging of the cover panel 48, electric conductors 52, in particular, carbon brushes, are provided in the rear region of the slide rails 46 on the support frame 36, wherein the brushes lie against the cover panel 48 and connect the panel electrically to the support frame 36.

In order to prevent electrostatic charging of the cover 24, all the parts of the cover 24 can be configured either electrically conductive or coated so that electric charges can be conducted away.

Similarly, the front panel 18, the side panels 22 and all the further parts of the draft shield 12 or the precision balance 10 can be configured electrically conductive and/or coated and electrically connected to one another so that an electrostatic charging of individual parts, in particular, the panel, is reliably prevented.

Figure 7:
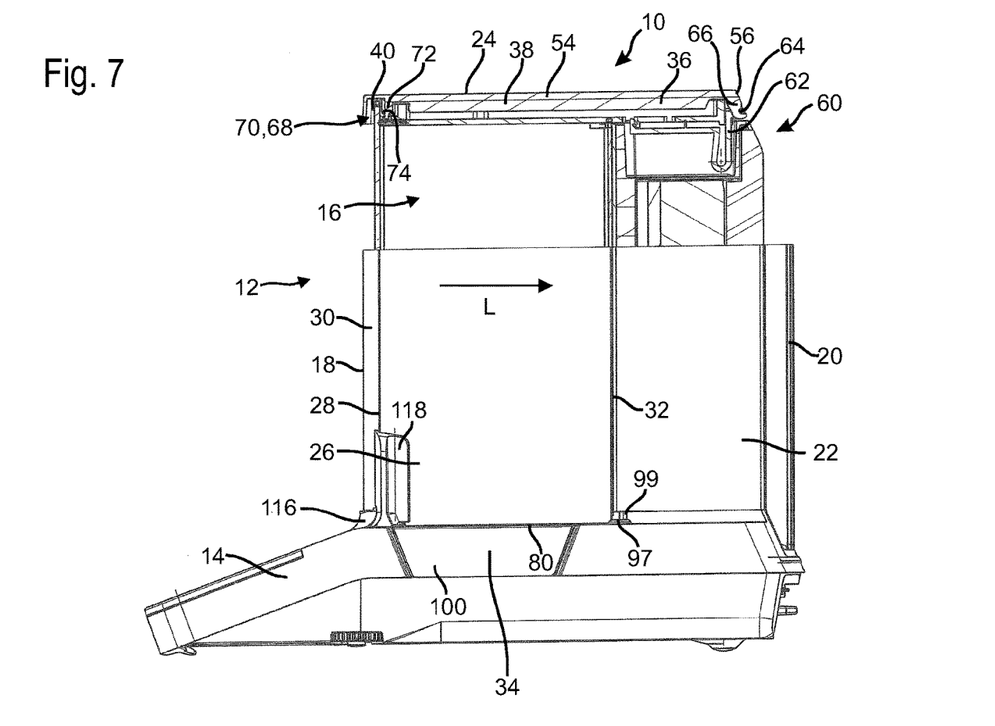
FIG. 7 is a side view of the balance of FIG. 1, in a partial sectional view in the region of the suspension guide and the cover.
Figure 7A:
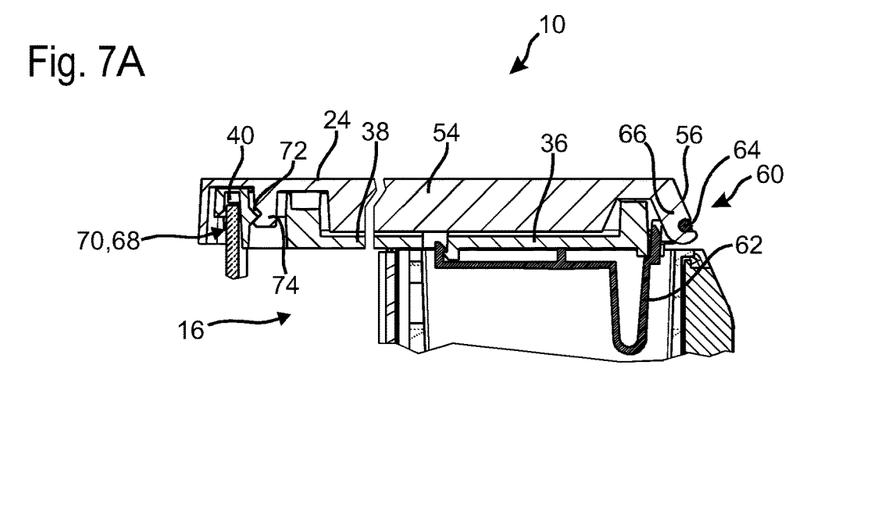
FIG. 7A is a partial view of the balance of FIG. 7, in the region of the suspension guide and the cover.

The cover 24 also has a cover element 54 which, as described below, is pivotable at one edge 56 of the cover 24, here the rear edge 56 between a holding position (FIG. 1) and a releasing position (FIGS. 3 and 4). Provided between the support frame 36 and the cover element 54 are spring elements 58 which load the cover element 54 toward the releasing position. The mounting 60 of the cover element 54 on the support frame 36 is formed by bearing elements 62 provided on the support frame 36 which each have a bearing pin 64 (see FIGS. 7 and 7A). The bearing elements 62 are configured to be elastically resilient in the longitudinal direction L. Bearing hooks 66 which are open in the longitudinal direction L, that is, rearwardly, and can engage on the bearing pins 64 are provided on the cover element 54.

Since the bearing elements 62 are configured resilient in the longitudinal direction L, the whole cover element 54 can be displaced to a limited extent in the direction toward the bearing 60, wherein the cover element is loaded by the elastically yielding bearing elements 62 in the direction toward a second edge 68, here the front edge 68 of the support frame 36.

In order to hold the cover 24 in the closed holding position (FIG. 7), holding elements 72, 74 are provided on the front edge 70 of the cover element opposite the bearing 60 and at the front edge 68 of the support frame. The holding elements 72, 74 are configured such that they fix the cover element 54 at the front edge 68 of the support frame 36. By displacement of the cover element 54 in the longitudinal direction L in the direction toward the bearing 60, the holding elements 72, 74 can be released.

Figure 6:
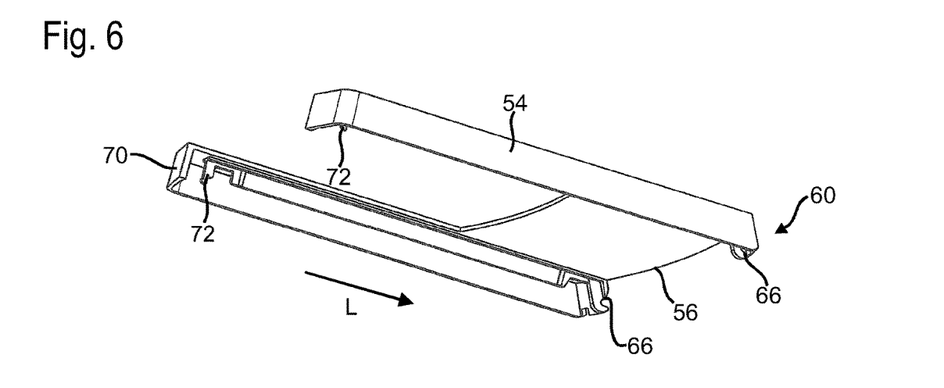
FIG. 6 is a perspective view from below of a cover element for a suspension guide according to the invention.

As shown in FIG. 6, the holding elements 74 are formed on the cover element 54 by locking elements facing away from the bearing hooks 66. The holding elements 72 provided on the support frame 36 are formed by locking receptacles which are directed in the direction toward the bearing 60. If the locking hooks, that is, the holding elements 74 are moved in the direction toward the bearing 60, they are released by the holding elements 72 formed by the locking receptacles, so that the cover element 54 can be pivoted about the bearing 60 into the releasing position.

The holding elements 72, 74 are thus released, for example, by a pressure on the front edge of the cover element 54, by which the cover element is pushed toward the bearing 60. Subsequently, the cover element 54 is moved by the spring elements 58 into the releasing position.

Even if no spring elements 58 are provided, it is easily possible to release the holding elements 72, 74 and to move the cover element into the releasing position. In order to release the holding elements 72, 74, pressure on the front edge 70 is needed. Following the release of the holding elements, the pressing direction must merely be changed and directed slightly upwardly. In particular, it is possible to select a pressing direction facing obliquely upwardly and in the longitudinal direction L, by which sufficient pressing force is applied to release the holding elements 72, 74 and the cover element 54 is subsequently moved into the releasing position without any change in the pressing direction. Thus, the cover element can be moved in a fluid movement from the holding position into the releasing position. Elaborate releasing of the holding elements 72, 74 is not necessary.

In the releasing position shown in FIGS. 3 and 4, it is also possible to remove the cover panel 48 from the support frame 36 without tools in that it is removed upwardly out of the slide rails 46.

Furthermore, in this releasing position, as described below, the side panels 26 of the draft shield 12 can also be removed without tools.

Figure 14:
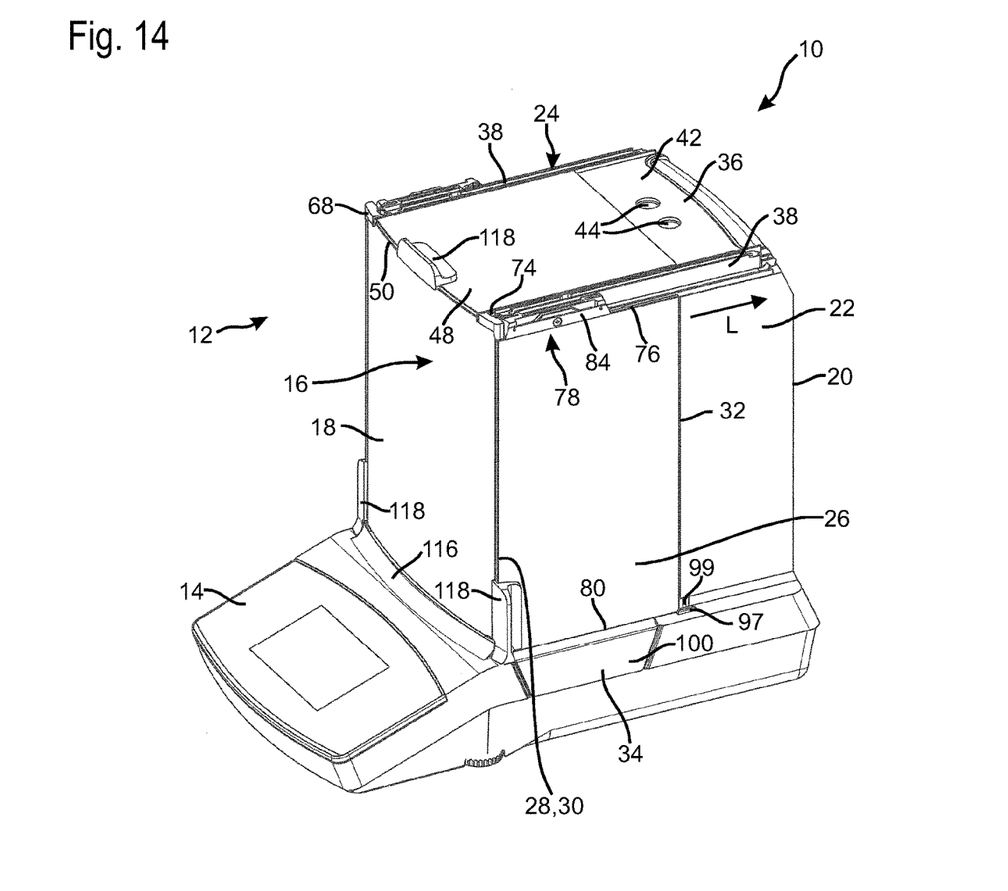
FIG. 14 is the balance of FIG. 1 with the cover element removed.

As shown in FIG. 14, the cover element 54 can be completely removed after moving into the releasing position, so that easier removal of the cover panel 48 and the side panels 26 is possible. This removal is possible since the bearing hooks 66 are configured open so that they can be easily released from the bearing pins 64. In the holding position, however, the bearing hooks 66 are biased by the spring pre-tension of the bearing elements 62 against the bearing pins 64 so that release is not possible. The bearing hooks 66 can, for example, also latch onto the bearing pins 64 in order to provide additional security against removal of the cover element 54.

The mounting of the side panels 26 is achieved with a suspension guide 78, shown in detail in FIGS. 8 to 12, arranged at the upper edge 76 of the side panels 26 and a contact surface 82 provided at the lower edge 80 of the side panels 26.

The suspension guides 78 are each formed by a guide rail 38 of the support frame 36 and by a holding device 84 on which the side panel 26 is held.

Figure 8:
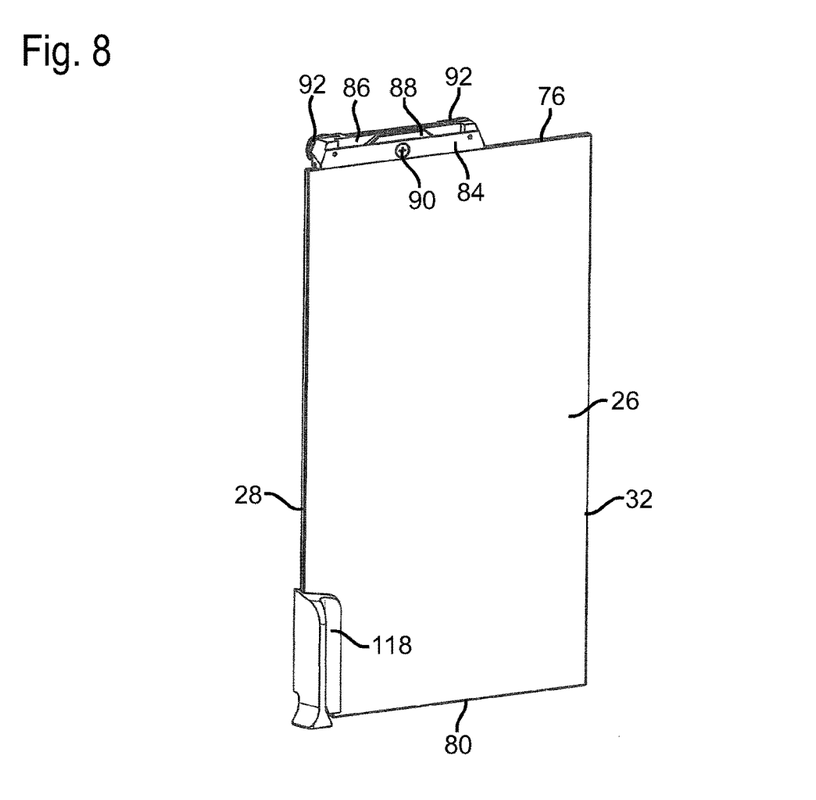
FIG. 8 is a perspective view of a side panel of the balance of FIG. 1 with a holding device of a suspension guide according to the invention.
Figure 9:
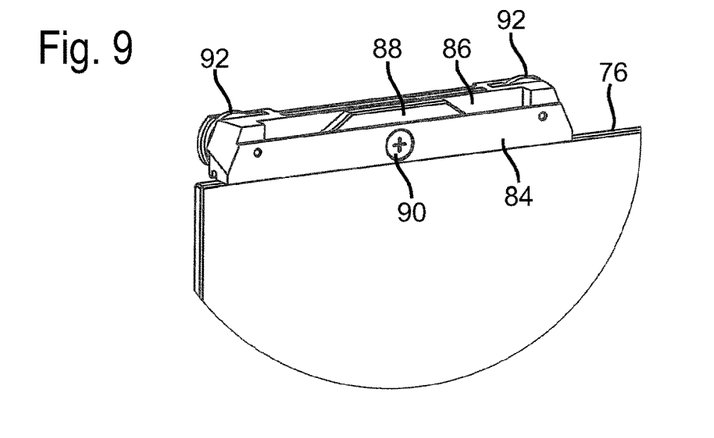
FIG. 9 is the holding device of FIG. 8 in a detail view.
Figure 10:
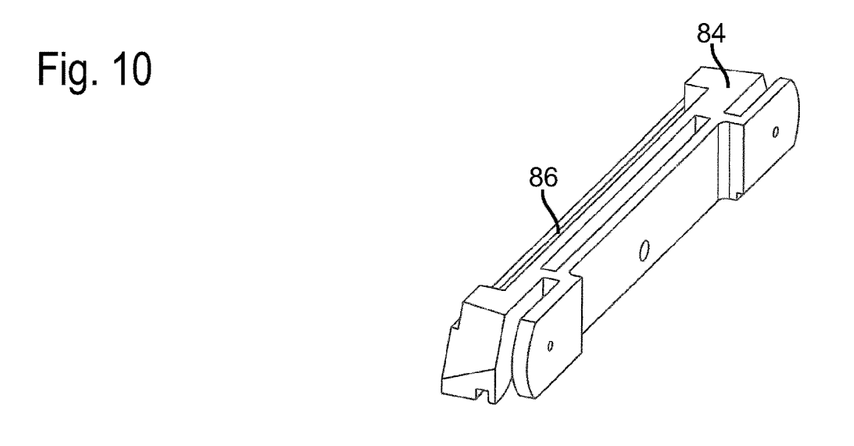
FIG. 10 is the holding device of FIG. 8 in a detail view.
Figure 11:
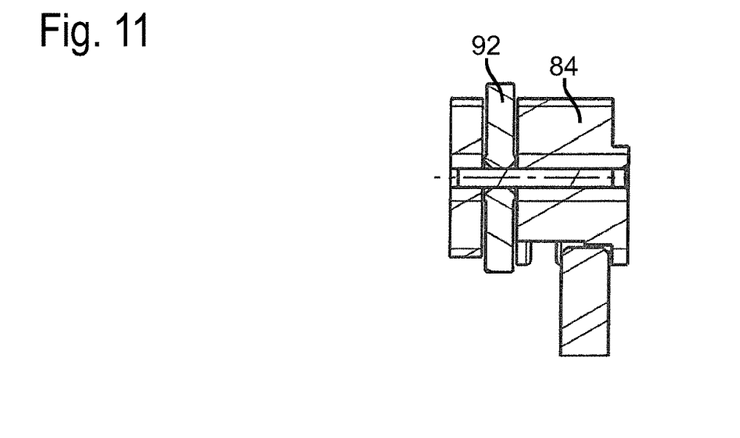
FIG. 11 is a sectional view through the holding device of FIG. 8 in the region of a guide element.

As shown in FIGS. 8 to 11, the holding device 84 has a seating 86 for the side panel 26. The seating 86 is formed by a slot through which a projection 88 of the side panel 26 is fed (FIG. 8). The projection 88 is fixed in the seating 86 by a screw 90. The screw 90 can clamp the side panel against the seating 86 or can extend through the side panel.

Also provided on the holding device 84 are guide elements 92 formed by rollers, with which the holding device 84 can be mounted in the guide rails 38 displaceable in the longitudinal direction L.

The contact surface 82 is formed by a lateral border of the weighing chamber base 34, wherein the contact surface 82 extends in the longitudinal direction L and substantially vertically.

The guide rails 38 each have an upwardly open groove 94 into which the guide elements 92 can be hung vertically from above. The assembly made of the holding device 84 and the side panel 26 can be pivoted in this assembled state about the contact line 96 between the guide rails 38 and the guide elements 92.

Figure 12:
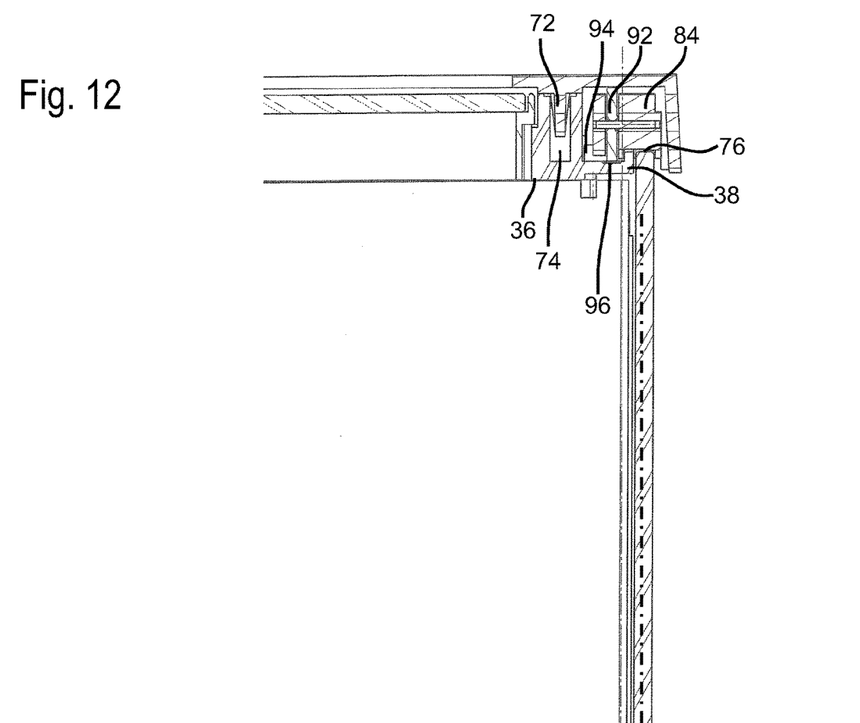
FIG. 12 is a sectional view through the draft shield of the balance of FIG. 1 in the region of the side panel.
Figure 13:
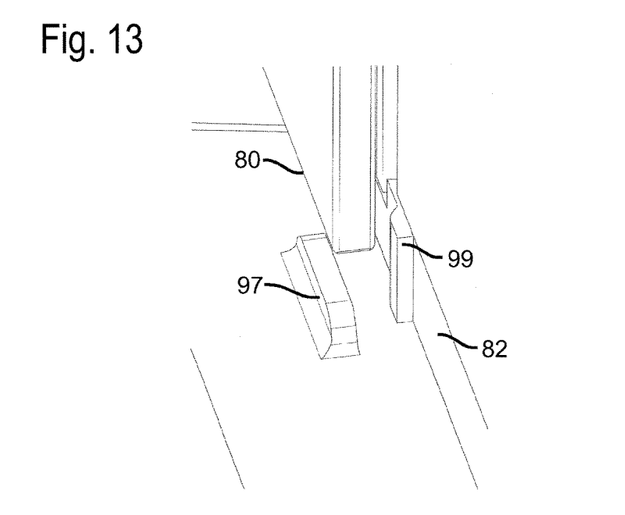
FIG. 13 is a detail view of the contact surface of the draft shield of the balance of FIG. 1.

As shown particularly in FIG. 12, the guide elements 92 are arranged outside the plane E which is formed by the seating 86 and the side panel 26. In this way, the center of gravity of the assembly formed from the holding device 84 and the side panel 26 is situated, in relation to FIG. 12, laterally offset from the vertical through the contact line 96. Due to gravity, this assembly is therefore urged to move the center of gravity under the contact line 96. As a result, the side panel 26 is pressed with the lower edge 80 against the contact surface 82 so that the side panel 26 lies closely against the contact surface 82.

Since the contact surface 82 extends in the longitudinal direction L, it also serves as a guide for the lower edge 80 of the side panel 26. Also provided on the contact surface 82 is a guide projection 97, which serves as a protective device in order to prevent lifting of the lower edge 80 of the side panel 26 from the contact surface 82. In normal operation of the precision balance 10 or of the draft shield 12, however, this guide projection 97 is not needed since the side panel 26 is pressed by gravity against the contact surface 82.

Furthermore, a detent stop 99 is provided on the side surface 22, wherein the detent stop holds the side panel 26 in the closed position.

Apart from the suspension guide 78 arranged at the upper edge 76 of the side panels 26, therefore, no additional complex mounting is needed at the lower edge 80.

Since the guide rails 38 are formed by upwardly open grooves 94, the side panels 26 can be easily removed vertically upwardly from the guide rails 38.

The assembly of the side panels 26 is also simplified since they have merely to be hung into the guide rails 38 with the holding devices 84 and the guide elements 92. Due to gravity, the lower edges 80 automatically come into contact with the contact surfaces 82. Complex orientation of the lower edges 80 or feeding into a lower guide is not necessary.

In order to prevent the removal of the side panels 26 during normal operation of the draft shield 12, in the holding position, the cover element 54 covers the guide rails 38 vertically upwardly. The guide elements 92 thus cannot be removed from the guide rails. In order to be able to remove the side panels 26, it is necessary to move the cover element 54 into the releasing position in which the guide rails 38 are open vertically upwardly.

Irrespective of the configuration of the holding device or of the guide elements 92, it is merely necessary for the guide elements 92 to be arranged outside the plane formed by the side panel 26 or the seatings 86, so that the side panel can tilt about the contact line 96 between the guide rail 38 and the guide element 92 against the contact surface 82.

In order to prevent tilting in the plane of the side panels 26, a plurality of holding devices 84 can also be provided at a side panel 26.

As shown in FIGS. 15 to 18, the contact surfaces 82 are arranged on the weighing chamber base 34 of the precision balance 10. Apart from the cover 24, the side panels 26 and the front panel 18, the weighing chamber base 34 is also configured demountable, so that this can also be removed from the precision balance 10 for cleaning.

For this purpose, the weighing chamber base 34 has a weighing chamber base portion 98 and two side flanges 100. The side flanges 100 are disposed at opposing edges 102 of the weighing chamber base portion 98 and are arranged substantially perpendicular to the weighing chamber base portion 98 and parallel to one another.

Situated at the inner surfaces 104 facing one another are fastening devices 106 which in this embodiment are formed by locking elements. Provided on the housing of the weighing device 14 are substantially horizontally extending locking edges 108 on which the fastening devices 106 can engage.

The weighing chamber basebase 34 is placed vertically from above onto the weighing device 14, by which the side flanges 100 encompass the housing on opposite sides. The weighing chamber base 34 is pushed onto the housing until the fastening devices 106 latch onto the locking edges 108. The side flanges 100 are configured elastically resilient so that they can give way during pushing onto the locking edges. If the fastening devices 106 are located behind the locking edges, the side flanges 100 are pressed resiliently against the housing, so that the fastening devices 106 latch onto the locking edges 108.

Figure 18:
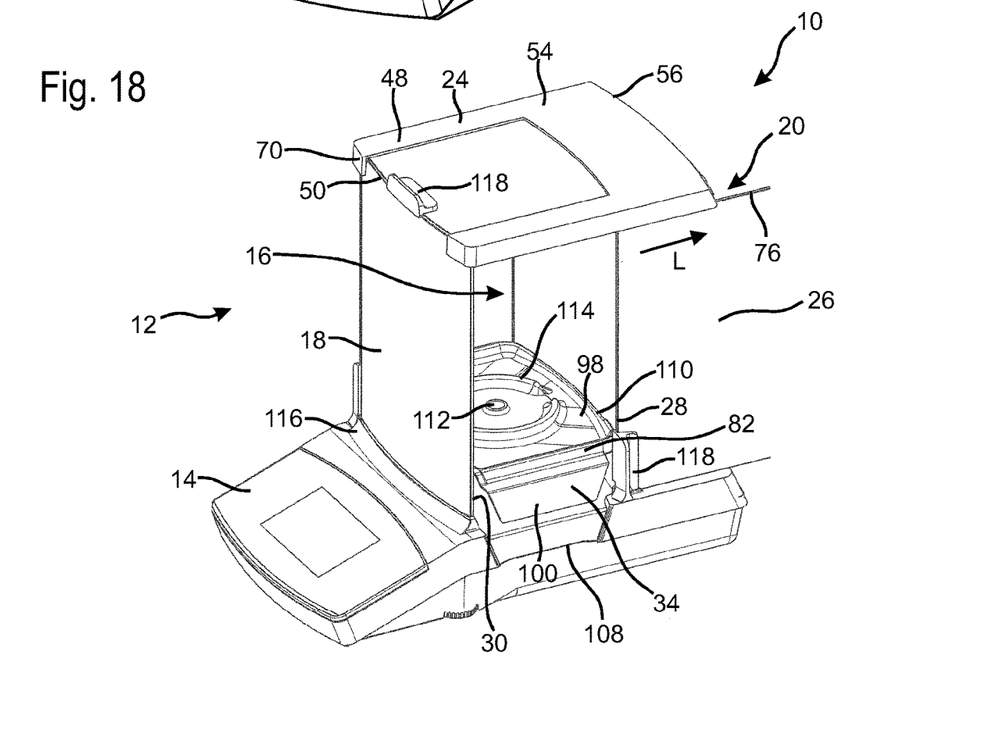
FIG. 18 is a second view of the precision balance of FIG. 17 with the front panel removed.

For demounting of the weighing chamber base 34, the side flanges 100 are pulled away laterally until the fastening devices 106 are released from the locking edges 108. Subsequently, the weighing chamber base 34 can be pulled upwardly from the housing (FIG. 18).

Figure 15:
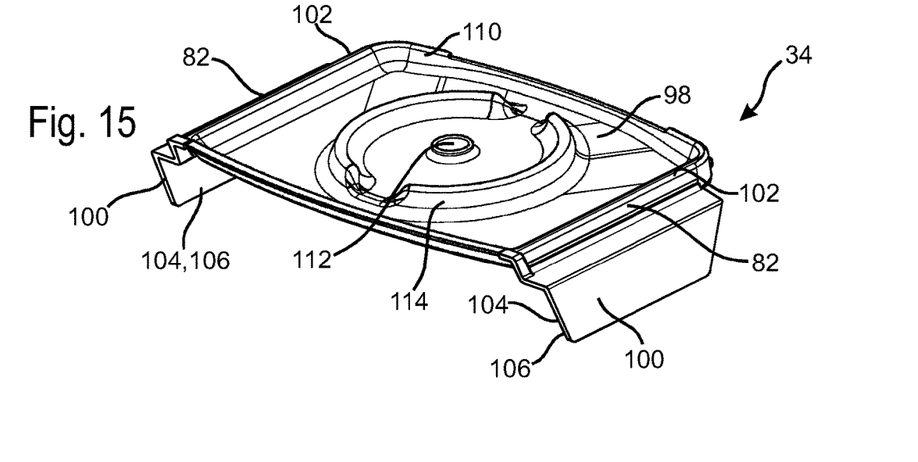
FIG. 15 is a perspective view of the weighing chamber base of the precision balance of FIG. 1.
Figure 17:
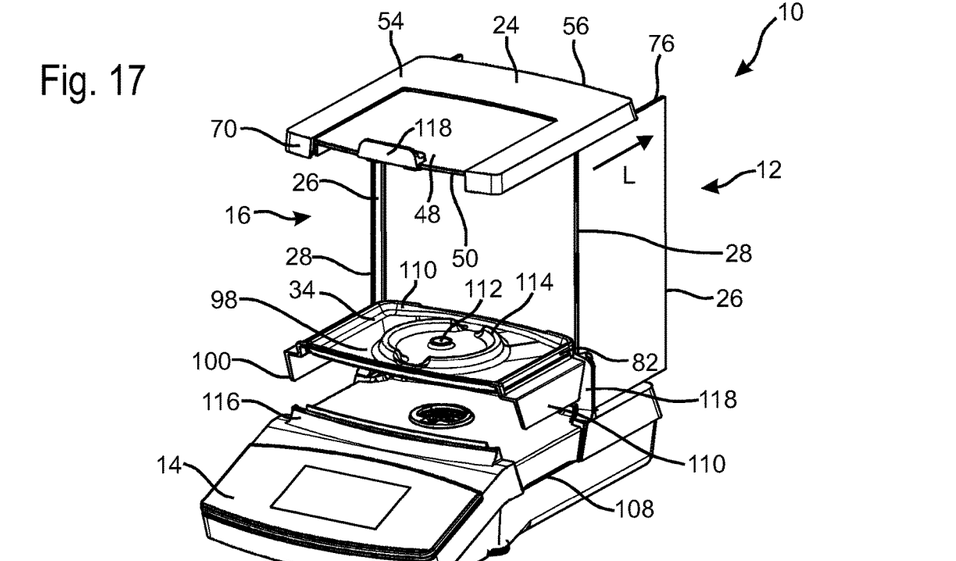
FIG. 17 is the precision balance of FIG. 1 with the weighing chamber base partially removed.

As shown in FIGS. 15 and 17, the contact surfaces 82 for the side panels 26 are each formed by a step provided on the side flanges 100, on which the guide projection 97 is also provided. Depending on the form of the housing and of the weighing chamber base 34, however, a step of this type is not necessary.

The weighing chamber base portion 98 is configured essentially planar (FIG. 15) wherein the peripheral edges 110 are raised relative to the remaining weighing chamber base portion 98. Situated centrally is a through opening 112 for a weighing mechanism (not shown in detail). Formed around this through opening 112 is also a raised edge 114.

The raised edges 110, 114 prevent liquids that find their way onto the weighing chamber base portion 98 from flowing out of the weighing chamber base 34 and, for example, through the through opening 112 to the weighing mechanism and contaminating it.

Figure 16:
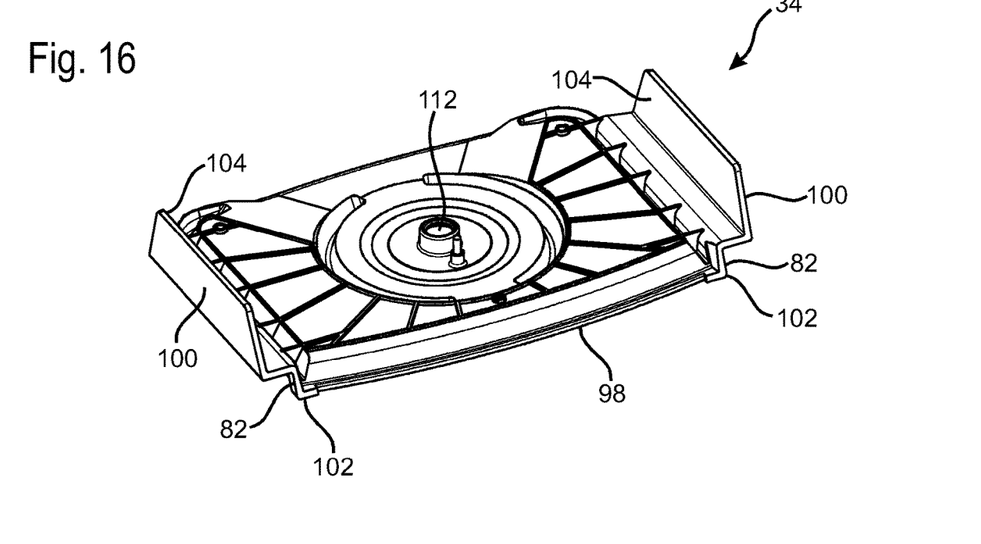
FIG. 16 is a rear view of the weighing chamber base of FIG. 15.

As shown in FIGS. 16 and 17, the side flanges 100 of the weighing chamber base 34 form the side walls 22 of the draft shield 12 in places. Since therefore no gap is present between the side walls and the weighing chamber base portion 98, liquids or foreign bodies which find their way onto the weighing chamber base 34 cannot penetrate into the housing and contaminate the weighing mechanism.

As FIGS. 17 and 18 show, apart from the side panels 26, the cover 24 and the weighing chamber base 34, the front panel 18 can also be removed from the holding elements 40 and a holding rail 116. For this purpose, the holding elements 40 are configured elastically resilient to a limited extent in the vertical direction so that for removal of the front panel 18, they can be lifted upwardly.

Thus, approximately all the parts of the draft shield 12 can be demounted without tools, so that easy cleaning of the draft shield 12 and the precision balance 10 and easy access to the weighing chamber 16 are possible.

In order to be able to clean the panels easily, that is, the cover panel 48, the side panels 26 and the front panel 18, components present on the panels, for example, handles 118 or the holding devices 84, can also be easily demounted, preferably without tools. In particular, the handles 118 can be easily latched on the panels, so that tool-free release of this latching is possible.

What is claimed is:

1. A cover for a draft shield of a precision balance, comprising:
   a support frame comprising holding elements and/or guide rails for a front panel and/or at least one side panel,
   a cover element which is pivotable, about a pivoting bearing provided at a first edge, between a holding position and a releasing position, relative to the support frame, and
   further holding elements positioned at a further edge of the cover element opposite the pivoting bearing, which fix the cover element at an edge of the support frame, wherein the further holding elements are configured to release by displacing at least one portion of the cover element in a direction toward the pivoting bearing.

2. The cover as claimed in claim 1, wherein the further holding elements comprise locking elements and/or locking receptacles provided on the cover element and directed away from the pivoting bearing and locking receptacles and/or locking elements provided on the support frame and directed toward the pivoting bearing.

3. The cover as claimed in claim 1, wherein an entirety of the cover element is displaceable toward the pivoting bearing in order to release the further holding elements.

4. The cover as claimed in claim 3, wherein the pivoting bearing is configured resilient away from the second edge, and wherein the pivoting bearing has bearing elements that are displaceable to a limited extent.

5. The cover as claimed in claim 4, wherein the bearing elements are spring loaded toward the holding elements.

6. The cover as claimed in claim 1, wherein the bearing elements each have a bearing pin, and bearing hooks, which engage the bearing pins, are provided on the cover element.

7. The cover as claimed in claim 1, further comprising at least one spring element, provided between the support frame and the cover element, which loads the cover element into the releasing position.

8. The cover as claimed in claim 1, wherein the cover has a cover panel which is displaceably mounted on the support frame, wherein in the holding position, the cover element holds the cover panel on the support frame and, in the releasing position, releases the cover panel.

9. The cover as claimed in claim 8, wherein the cover panel comprises an electrically conductive coating.

10. The cover as claimed in claim 8, further comprising slide rails on the support frame for the cover panel, wherein the slide rails consist of plastics, and wherein carbon brushes are provided on the slide rails as electric conductors which lie against the cover panel and connect the cover panel electrically to the support frame.

11. The cover as claimed in claim 1, wherein the support frame, the cover panel and/or the cover element are configured or coated to be electrically conductive and are electrically conductively interconnected.

12. A draft shield for a precision balance comprising:
    a front panel, a rear wall, two mutually opposed side panels and
    a cover as claimed in claim 1,
    wherein the support frame comprises guide rails for the side panels and/or holding elements for the front panel.

13. The draft shield as claimed in claim 12, wherein the guide rails have a U-shaped, upwardly open cross-section and the cover element covers the guide rails in the holding position.

14. The draft shield as claimed in claim 12 wherein the support frame is held on the rear wall.

15. The draft shield as claimed in claim 12, wherein the cover, the front panel and/or the side panels are configured or coated to be electrically conductive and are electrically conductively interconnected.

16. The cover as claimed in claim 1, wherein the further holding elements are configured to release the cover element from the support frame at the further edge.

17. The cover as claimed in claim 1, wherein the further holding elements are configured to release the further holding elements from each other.

* * * * *